(12) United States Patent
Loomis

(10) Patent No.: US 8,451,225 B2
(45) Date of Patent: May 28, 2013

(54) COMPUTER MOUSE CUSHION

(76) Inventor: Harriett Gidley Loomis, N. Kingstown, RI (US)

(*) Notice: Subject to any disclaimer, the term of this patent is extended or adjusted under 35 U.S.C. 154(b) by 306 days.

(21) Appl. No.: 12/569,063

(22) Filed: Sep. 29, 2009

(65) Prior Publication Data
US 2010/0090953 A1    Apr. 15, 2010

Related U.S. Application Data

(60) Provisional application No. 61/194,768, filed on Sep. 30, 2008.

(51) Int. Cl.
G06F 3/039    (2006.01)

(52) U.S. Cl.
USPC .......... 345/163; 345/168; 345/156; 248/118; 248/118.3; 248/118.1

(58) Field of Classification Search
None
See application file for complete search history.

(56) References Cited

U.S. PATENT DOCUMENTS

| | | | | |
|---|---|---|---|---|
| 5,125,606 A | * | 6/1992 | Cassano et al. | 248/118 |
| 5,165,630 A | * | 11/1992 | Connor | 248/118.1 |
| 5,228,655 A | * | 7/1993 | Garcia et al. | 248/118 |
| 5,562,270 A | * | 10/1996 | Montague | 248/118.1 |
| 5,730,711 A | * | 3/1998 | Kendall et al. | 602/64 |
| 6,075,516 A | * | 6/2000 | Rice | 345/156 |
| 6,157,370 A | * | 12/2000 | Kravtin et al. | 345/163 |
| 6,396,478 B1 | * | 5/2002 | Kravtin et al. | 345/163 |
| 6,932,304 B1 | * | 8/2005 | Villamar | 248/118.1 |
| 2002/0075236 A1 | * | 6/2002 | Danzyger et al. | 345/163 |
| 2003/0169236 A1 | * | 9/2003 | Crocker | 345/168 |
| 2007/0252050 A1 | * | 11/2007 | Kennedy | 248/118.3 |

FOREIGN PATENT DOCUMENTS

GB    2288454    * 10/1995

* cited by examiner

Primary Examiner — Van Chow
(74) Attorney, Agent, or Firm — Mark Tetreault

(57) ABSTRACT

A cushion that provides support for the heel of the hand and wrist, elevates the wrist and minimizes pressure on the central hand/wrist area of nerves, tendons, and vessels while using a computer mouse. A cushion having an upper and lower surface connected by at least one side wall, with a fixation to a computer mouse, surrounding a resilient pad. The lower surface is low friction, to slide on a separate planar surface. The top surface is soft. The middle layer(s) is of varying resilient materials that support the sides of the heel of the hand/wrist, while leaving the central area open. The size of this cushion may vary, to support different sized hands, while using a computer mouse. The connection to the mouse is variable to fit different sizes and shapes of computer mouse.

8 Claims, 2 Drawing Sheets

Top View

Figure 1: Side View: Other side is a mirror image
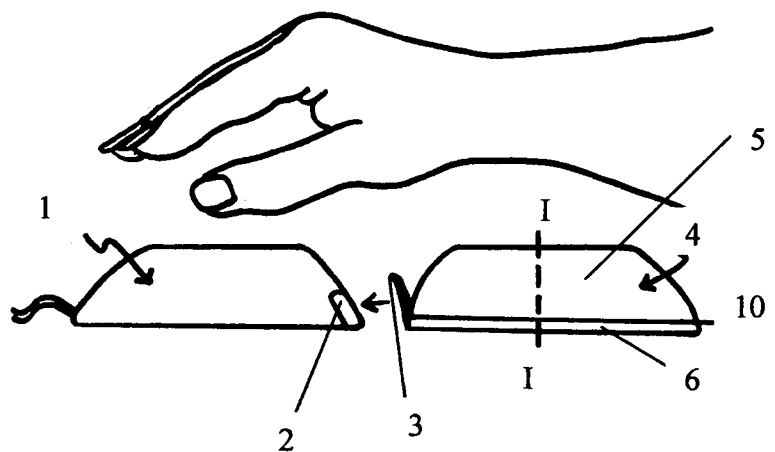
Figure 2: Top View
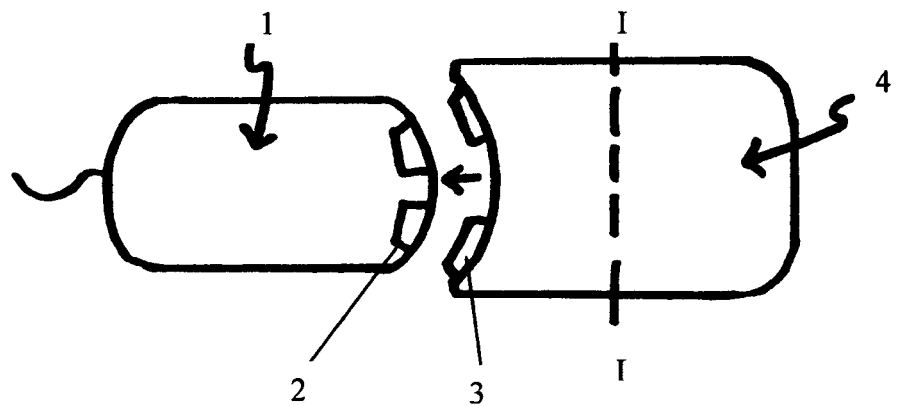

Figure 3: Cross Sectional View take along line I - I
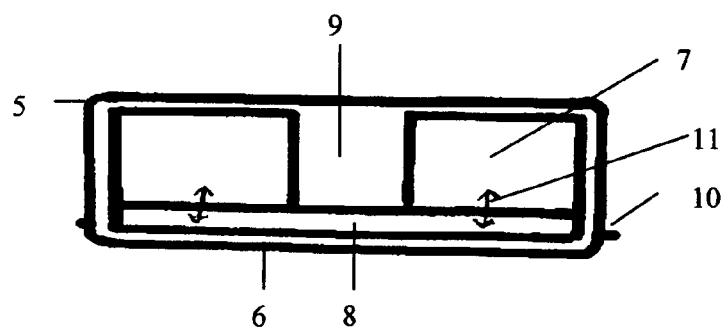
Figure 4: Alternate view of Fig. 3 with a user's wrist shown for environmental purposes.
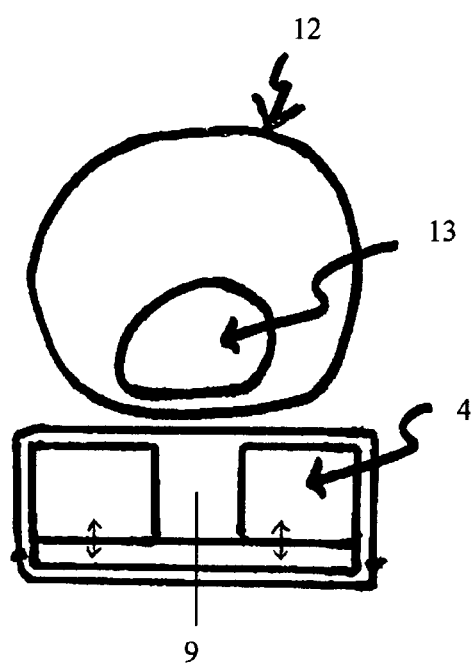

COMPUTER MOUSE CUSHION

CROSS-REFERENCE TO RELATED APPLICATIONS

This application is related to and claims priority from earlier filed U.S. Provisional Patent Application No. 61/194,768, filed Sep. 30, 2008, the contents of which are fully incorporated herein by reference.

BACKGROUND OF THE INVENTION

The present invention relates generally to accessories for use with a computer mouse. More specifically, the present invention relates to a support pad that is affixed to a computer mouse in order to provide support to the hand and wrist of the user.

It is well known that the extended use of a computer pointing device, such as a computer mouse, can cause a computer user to suffer from cumulative trauma disorder (CTD) or repetitive strain injuries (RSI). Computer users can often be afflicted with pains in the hands and the wrists caused by excessive wrist movements such as flexion and extension of the wrist.

Studies have shown that pressure on the underside of the wrist can irritate wrist tissue causing inflammation that can compress the median nerve, and increase the risk of carpal tunnel syndrome. Repetitive stress injuries, such as carpal tunnel syndrome, can be disabling and are costly, both in terms of medical expenses and in terms of lost work time.

There are many other products on the market that support or raise/realign the hand/wrist area. They are equally supportive across the width of the wrist. While the pressure to the center of the wrist may be less than pressing on a hard desk, it is still pressure on the center of the hand/wrist area.

There are mouse pads on the market that have raised a padded or gel back edges, freeing the hand/wrist area of pressure, but compressing the tendons, vessels, and nerves slightly farther up on the forearm. This forearm area rubs or saws across the padding as the mouse and hand are moved. There are also assorted cushions, both movable and stationary, wearable wrist splints, and gloves; all with the same result, equal pressure across the wrist and central carpal tunnel area. Many of these products, like this mouse cushion, also raise the wrist, providing a more neutral hand/wrist position.

There is therefore a need for a support pad support pad for use with a computer mouse that provides support to the hand and wrist of the user while minimizing or eliminating support pressure from the forearm and preventing compression of the tendons, vessels and nerves in the forearm.

BRIEF SUMMARY OF THE INVENTION

In this regard, the present invention is a support pad that provides ergonomic support to the heel of the hand and wrist while using a computer mouse, to reduce stress and help to prevent cumulative trauma when used in conjunction with a computer pointing device such as a computer mouse. The unique feature is the open middle area of the top support layer which eliminates or minimizes pressure on this central area, as the rest of the hand/wrist compresses the surrounding cushion. This ergonomic hand support device does not compromise the productivity of a computer user. It attaches to the back edge of the mouse so that it moves in unison with the mouse and hand with minimal effort. The hand/wrist area stays comfortably stationary on the mouse cushion during use. It provides a cushioned barrier between the hand and the desk surface or mouse pad, so that this area is not pushed/pulled or dragged over the surface. This minimizes irritation, especially after surgery to this area. The wrist is raised slightly to reduce physical stress.

The mouse cushion is readily removable with the use of a hook and loop fastening system such as Velcro™.

The mouse cushion is hand washable.

The mouse cushion, while installed, can be used by anyone. It does not have to be removed when there are multiple users of the computer and mouse.

The computer mouse remains usable with the loop fastening attached, but the mouse cushion removed.

The mouse cushion can be used on many shapes and sizes of computer mice, including the tiny mouse that is sometimes used with laptop computers. The mouse cushion can be used on a mouse that is hard wired to the computer or wireless.

The mouse cushion can be used on a flat desktop or when the mouse is near the edge of a desk or tray where the hand would be hanging off the edge some of the time.

The mouse cushion can be used with our without a mouse pad.

The mouse cushion can be used as a post-surgical recovery tool for someone who has had Carpal Tunnel surgery, and/or as a preventative aid to minimize or prevent compression of the medial hand/wrist area.

These together with other objects of the invention, along with various features of novelty that characterize the invention, are pointed out with particularity in the claims annexed hereto and forming a part of this disclosure. For a better understanding of the invention, its operating advantages and the specific objects attained by its uses, reference should be had to the accompanying drawings and descriptive matter in which there is illustrated a preferred embodiment of the invention.

BRIEF DESCRIPTION OF THE DRAWINGS

In the drawings which illustrate the best mode presently contemplated for carrying out the present invention:

FIG. 1 is a side view of the computer mouse cushion of the present invention;

FIG. 2 is a top view of the computer mouse cushion of the present invention;

FIG. 3 is a cross sectional view taken along line I-I.

FIG. 4 is an alternate view of FIG. 3 with a user's wrist shown for environmental purposes.

DETAILED DESCRIPTION OF THE INVENTION

Now referring to the drawings, the computer mouse cushion is shown and generally illustrated in the figures. FIG. 1: Side view: The other side is a mirror image. The computer mouse 1 (not part of the patent) has two loop fastener tabs 2 adhered to its back side. The mouse cushion 4 attaches to the mouse with two tabs of hook fastener 3 that are sewn onto the cushion where the top 5 material joins the bottom 6 material, at seam 10. The exterior of the mouse cushion 4 has a soft fabric top surface 5 and a bottom smooth low-friction fabric surface 6.

FIG. 2: Top View: The mouse 1 has two tabs of loop (pile) fastener 2, adhered, one on each side of the back surface. The mouse cushion 4 has two tabs of hook fastener 3 attached to the front edge near each side. The mouse cushion is approximately 3"-4" wide, 4"-5" long, and ½"-1" thick. The mouse cushion may have a curved front edge to fit around a mouse, and may have a curved back edge.

FIGS. 3 & 4 Cross Section I-I, of the Mouse Cushion 4, viewed from the back end: The top 5 and bottom 6 fabrics, seamed together at 10, surround a resilient (possibly foam rubber) inside. The resilient inside may be one or more layers that result in a solid bottom layer 8 with two parallel top walls 7. As can be seen viewing FIG. 3 in connection with FIG. 4, the cross section of the mouse cushion 4 leaves an open area 9, where the carpal tunnel area 13 of the hand/wrist 12 rests. If 7 and 8 are separate layers, then they are adhered together, shown by the arrows 11.

While there is shown and described herein certain specific structure embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed:

1. A wrist support for use with a computer mouse comprising:
    a bottom layer;
    two resilient, compressible parallel top walls positioned in spaced apart relation on a top surface of said bottom layer forming a void therebetween;
    a soft fabric outer covering enclosing the top walls, side walls and said void;
    attachment means for connecting said wrist support to a computer mouse wherein said wrist support moves in conjunction with said computer mouse, said attachment means comprising:
        at least one tab extending outwardly from a front portion of said wrist support;
        one part of hook and loop fastener material affixed to said tab; and
        a corresponding part of hook and loop fastener having an adhesive on a rear surface thereof capable of adhering to a computer mouse.

2. The wrist support of claim 1, wherein said void corresponds to a carpal tunnel region of a user's wrist positioned on said wrist support.

3. The wrist support of claim 1, wherein said support supports a user's wrist on the resilient, compressible parallel walls, adjacent to a carpal tunnel region thereof.

4. The wrist support of claim 1, wherein a portion of said outer covering beneath said bottom layer is formed from a smooth low-friction fabric surface.

5. A wrist support for use with a computer mouse comprising:
    a bottom layer;
    two parallel resilient, compressible top walls positioned in spaced apart relation on a top surface of said bottom layer forming a void therebetween;
    a soft fabric outer covering enclosing the top walls, side walls and said void; and
    attachment means for connecting said wrist support to a computer mouse, wherein said wrist support moves in conjunction with said computer mouse, said attachment means further comprising:
        at least one tab extending outwardly from a front portion of said wrist support;
        one part of hook and loop fastener material affixed to said tab; and
        a corresponding part of hook and loop fastener having an adhesive on a rear surface thereof capable of adhering to a computer mouse,
    wherein said void corresponds to a carpal tunnel region of a user's wrist positioned on said wrist support.

6. The wrist support of claim 5, wherein a portion of said outer covering beneath said bottom layer is formed from a smooth low-friction fabric surface.

7. A computer mouse comprising in combination:
    a computer mouse; and
    a wrist support, comprising:
        a bottom layer;
        two parallel resilient, compressible top walls positioned in spaced apart relation on a top surface of said bottom layer forming a void therebetween;
        a soft fabric outer covering enclosing the top walls, side walls and said void; and
        attachment means for connecting said wrist support to said computer mouse, said attachment means further comprising:
            at least one tab extending outwardly from a front portion of said wrist support;
            one part of hook and loop fastener material affixed to said tab; and
            a corresponding part of hook and loop fastener having an adhesive on a rear surface thereof capable of adhering to a computer mouse,
    wherein said wrist support moves in conjunction with said computer mouse, wherein said void corresponds to a carpal tunnel region of a user's wrist positioned on said wrist support.

8. The computer mouse of claim 7, wherein a portion of said outer covering beneath said bottom layer is formed from a smooth low-friction fabric surface.

* * * * *